H. D. JAMES.
SYSTEM OF ELECTRIC MOTOR CONTROL.
APPLICATION FILED JUNE 8, 1907.
992,201.
Patented May 16, 1911.
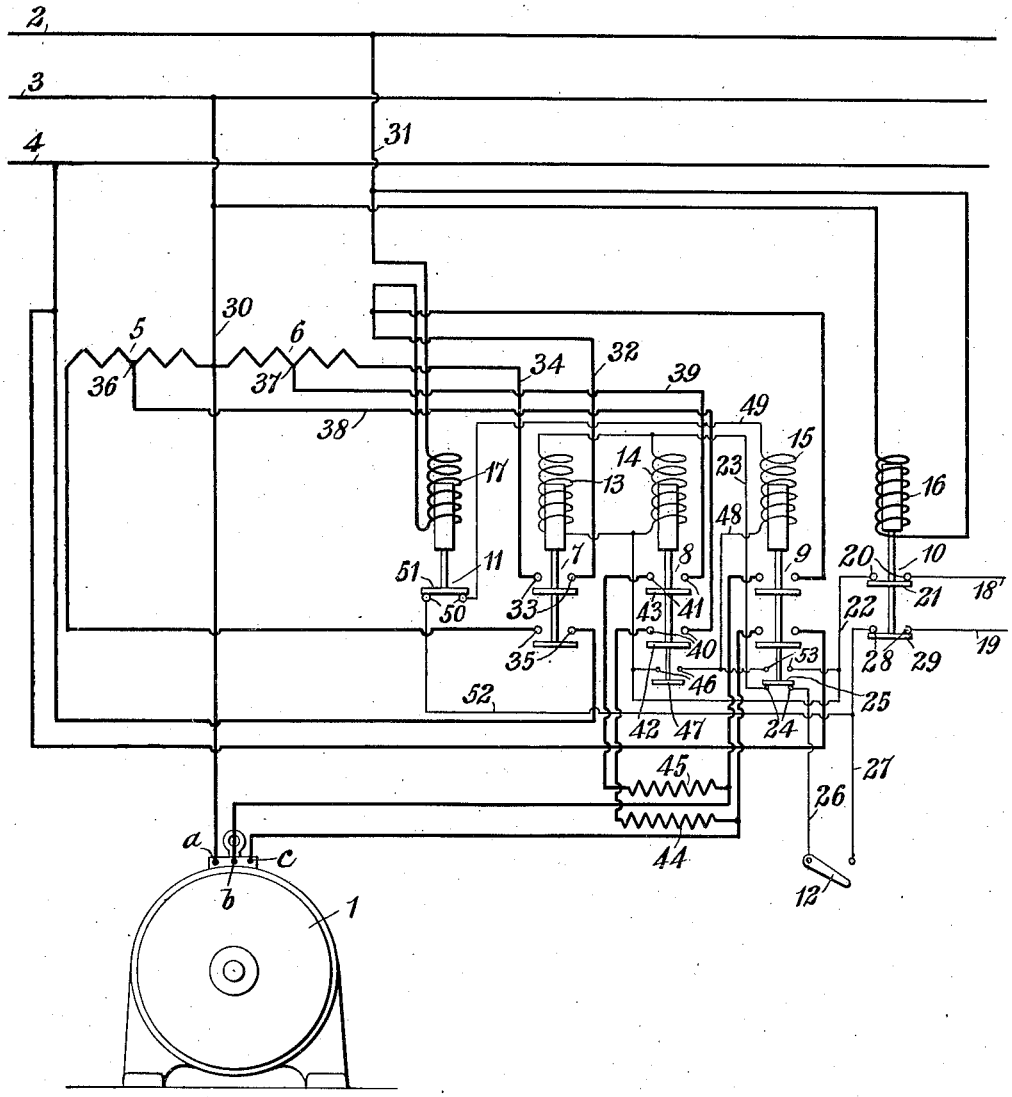
WITNESSES:
INVENTOR
Henry D. James
BY
Wesley G. Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRIC-MOTOR CONTROL.

992,201. Specification of Letters Patent. Patented May 16, 1911.

Application filed June 8, 1907. Serial No. 377,930.

*To all whom it may concern:*

Be it known that I, HENRY D. JAMES, a citizen of the United States, and a resident of Pittsburg, in the county of Allegheny and State of Pennsylvania, have invented a new and useful Improvement in Systems of Electric-Motor Control, of which the following is a specification.

My invention relates to systems of electric motor control, and it has for its object to provide a system of this class that shall comprise a plurality of independently operated switches for governing the acceleration of alternating current motors.

Induction motors have usually been governed by manually operated controllers which first connect the motors to relatively low-voltage taps of starting transformers and are then thrown to motor-running positions, in which the motors are connected directly to the supply circuit.

My control system is especially adapted for motors of the above-mentioned type and embodies means for delaying the closure of the last switch which connects the motor directly to the line and, in this way, avoids the possibility of injuring the motor by supplying the line voltage to its winding before it has substantially attained its normal running speed. Means are also provided for automatically interrupting the motor circuit if the voltage falls below a predetermined value.

The single figure of the accompanying drawing is a diagrammatic view of a control system arranged in accordance with my invention.

Referring to the drawing, an electric motor 1 is first supplied with alternating current energy from a three-phase circuit 2—3—4, through transformers 5 and 6, and, when a predetermined speed is attained, the motor is supplied with energy directly from the line, the circuit connections being governed by independently operated switches 7, 8 and 9, a line relay switch 10 and a limit switch 11. The independently operated switches are controlled by a master switch 12 and are, respectively, provided with operating magnet windings 13, 14, 15, 16 and 17.

Although the motor shown in the drawing is connected to a three-phase supply circuit, my invention is not limited in this regard and those skilled in the art may readily adapt my improved system for use with either single or two-phase motors.

The control circuits of the system may be energized from any suitable source, they being here shown as connected to an independent circuit 18—19. Assuming that the switches occupy the positions shown in the drawing, if the master switch 12 is closed, a circuit is completed from control line conductor 18 through contact terminals 20 (which are bridged by contact member 21 when the switch 16 is closed), conductor 22, magnet windings 13 and 14 of the switches 7 and 8, conductor 23, contact terminals 24 (which are bridged by contact member 25 when the switch 9 is open), conductor 26, master switch 12, conductor 27, contact terminals 28 (which are bridged by a contact member 29, when the switch 16 is closed), to the opposite control line conductor 19. Switches 7 and 8 being thus closed, provided the switch 9 is open, motor circuits are established as follows: line conductor 3 is connected directly to the terminal $a$ of the motor, through a conductor 30. Line conductor 2 is connected, through conductor 31 and magnet winding 17 of the switch 11, conductor 32, contact terminals 33 of the switch 7, and conductor 34, to one end of the transformer 6. The line conductor 4 is connected, through contact terminals 35 of the switch 7, to one end of the transformer 5, the opposite ends of the transformers being connected to each other and to the conductor 30. Motor terminals $b$ and $c$ are connected to intermediate points 36 and 37, in the transformers 5 and 6, through conductors 38 and 39, contact terminals 40 and 41 (which are respectively bridged by contact members 42 and 43, when the switch 8 is closed), and preventive resistances 44 and 45.

When the motor is first connected to the line, through the transformers 5 and 6, as above indicated, sufficient current will usually be transmitted through the conductor 31 and the magnet winding 17 to open the limit switch 11 and, consequently, the switch 9 will not be closed until this current falls below a predetermined amount. After the switch 8 is closed and the limit switch 11 has dropped, a circuit is completed from the conductor 22 through contact terminals 46 (which are bridged by a contact member 47 when the switch 8 is closed), conductor 48, magnet winding 15 of the switch 9, conductor 49, contact terminals 50 (which are bridged by a contact member 51 when the switch 11 is down), and conductor 52 to the opposite control conductor 19. The completion of this circuit energizes the magnet winding 15 so that the switch 9 is closed, and the motor is then directly connected to the line. The switch 9 is held in its closed position, since a circuit is now established from the conductor 22 through contact terminals 53 (which are bridged by the contact member 25), conductor 48, and magnet winding 15 to the conductor 49, and from which point the circuit is completed as above indicated. Although the motor terminals $b$ and $c$ are now connected through the switch 9 directly to the line conductors 2 and 4, the transformers 5 and 6 will not be injured, although portions of their windings are short-circuited, since preventive resistances 44 and 45 are included in the circuit, in a well-known manner. The magnet windings 13 and 14 of the switches 7 and 8 are deënergized as soon as the switch 9 is closed, by reason of the disengagement of the contact member 25 from the contact terminals 24 and, consequently, these switches are permitted to open and the transformers are open-circuited.

Although, as shown in the drawing, the contact member 25 will be separated from the contact terminals 24 before the switch 9 occupies its closed position, the time consumed in closing the switch is obviously so short that the magnets 13 and 14 cannot be deënergized and the switches 7 and 8 opened before the switch 9 is closed.

Structural modifications of the individual switches for the purpose of improving operating conditions, durability, etc., may, of course, be made, if desired, without departing from my invention.

The circuit connections of my improved system may, of course, be varied within the scope of my invention, and I desire that only such limitations shall be imposed as are indicated in the appended claims.

I claim as my invention:

1. In a control system, the combination with an electric motor, a supply circuit and an interposed voltage-reducing transformer, of independently operated control switches for governing the transformer circuit connections and short-circuiting the transformer to increase the voltage impressed on the motor without interrupting the circuit, and means for delaying the closure of the transformer short-circuiting switch.

2. In a control system, the combination with an electric motor, a supply circuit, a transformer and a resistance, of a plurality of independently operated switches for successively connecting the motor to an intermediate point in the transformer, with the resistance in circuit, the transformer to the supply circuit, and the motor directly to the supply circuit and finally interrupting the resistance circuit.

3. In a control system, the combination with an electric motor, a supply circuit, a transformer and a resistance, of a plurality of independently operated switches for successively connecting the transformer to the supply circuit, the motor to an intermediate point in the transformer, with the resistance in circuit, connecting the motor directly to the supply circuit and opening the resistance circuit, and means for automatically delaying the connection of the motor directly to the supply circuit.

4. In a control system, the combination with an electric motor, a supply circuit, a transformer and a resistance, of a plurality of independently operated switches for first connecting the transformer to the supply circuit and the motor to an intermediate point in the transformer with the resistance in circuit, and finally connecting the motor to the circuit and interrupting the resistance circuit, and means for automatically delaying the final connection of the motor to the supply circuit until the current traversing the motor circuit falls below a predetermined amount.

5. In a control system, the combination with a three-phase electric motor having three circuit terminals, supply circuit conductors therefor, two transformer sections and a pair of resistance sections therefor, of a plurality of independently operated switches for successively connecting the transformer sections across the supply circuit conductor, the motor terminals respectively to one circuit conductor and to intermediate points in the transformer sections with the resistance sections in circuit, and finally connecting the remaining motor terminals to the other circuit conductor and interrupting the resistance sections, and a series relay switch for delaying the connection of the motor directly to the line conductors until the current traversing the motor windings falls below a predetermined amount.

6. In a control system, the combination with an electric motor, a supply circuit, a transformer, a resistance therefor and a plurality of control switches for automatically connecting the motor to intermediate transformer taps through said resistance and the transformer to the supply circuit and for finally connecting the motor to the supply circuit directly and interrupting the resistance circuit, of a series relay switch for delaying the final connection of the motor to the circuit, and a shunt relay switch for interrupting the supply circuit when the voltage falls below a predetermined amount.

In testimony whereof, I have hereunto subscribed my name this 31st day of May, 1907.

HENRY D. JAMES.

Witnesses:
    EDWIN LEHR,
    BIRNEY HINES.